United States Patent Office 2,749,232
Patented June 5, 1956

2,749,232

CHLOROPHENYL CYANOACRYLIC ACIDS AND DERIVATIVES

Waldo B. Ligett, Pontiac, and Calvin N. Wolf, Detroit, Mich., assignors to Ethyl Corporation, New York, N. Y., a corporation of Delaware No Drawing. Application May 6, 1952,
Serial No. 286,432

19 Claims. (Cl. 71—2.6)

This invention relates to a novel class of synthetic organic compounds which exhibits important, and in many respects heretofore unknown, responses in the growth processes of plants. More specifically, our invention relates to materials containing the α-cyano-β-polychlorophenyl acrylic grouping.

Much attention has been directed in recent years to providing controlled regulation of the morphological processes of living plants, wherein the term "plant" is used in the broadest sense of the term. A number of materials have been described, both naturally occurring and synthetic, which produce morphological responses in plants. In general, more or less specificity has been noted, both with regards to the plant species effected and to method of application. Likewise, the effects appear to be limited to narrow concentration ranges of the material being applied. Furthermore, chemicals quite specific in structure or formulation have been required.

One important effect is the stimulation of growth. This can take many forms but in general each such effect can be achieved by only a limited number of materials. Among the growth stimulation effects can be noted a development of oversize plant parts as, for example, the development of blossoms or fruits of larger than normal size. Other examples of growth stimulation include increasing the rate of formation of root systems principally from cuttings.

Another important effect achieved by certain growth regulants includes the suppression of one or more growth processes. Certain materials are known to be capable of preventing the formation of the abscission layer of cells in plant appendages. This effect finds application in preventing premature drop of fruit.

Still another type of growth regulation is shown by a general increase in the rate of growth of a plant and usually materials which are effective in this respect when employed in large concentrations exhibit a growth destruction effect as a result of over-stimulation of the growth process. Such materials which do not permit normal growth in the useful growth stimulation range of concentrations, cause more or less deformities in the plant such as bending or epinasty of the stem.

One characteristic of a growth regulant is translocation, that is, when applied at a specific point in the plant organism the effect may be observable at a site distant from the application. For this reason it was at one time customary to refer to such materials as plant hormones by analogy to the materials which have a hormonic effect in animal organisms.

In the materials previously known control of the desired effect has been difficult to achieve and the period of application in the growth cycle has been of extreme importance. Furthermore, the selectivity of the material towards the plant organism has, in most instances, been insufficient to permit widespread application under field conditions without subjecting other plants in the area to the effect of the materials being applied with consequent destructive effects.

It is an object of our invention to provide a novel chemical grouping having plant growth regulant properties. It is a further object of our invention to provide materials which, when applied to living plants, can produce important and novel morphological responses in a controlled manner. Other objects of our invention will appear from the further description hereinafter.

The novel compounds which we have discovered comprise the α-cyano-β-polychlorophenyl acrylic structure. We have found that when two or more chlorine atoms are present in the β-phenyl group of the α-cyano-β-phenyl acrylic structure high morphological activity exists. In the free acid form our compounds comprise α-cyano-β-(2,3-dichlorophenyl) acrylic acid, α-cyano-β-(2,4-dichlorophenyl) acrylic acid, α-cyano-β-(2,5-dichlorophenyl) acrylic acid, α-cyano-β-(2,6-dichlorophenyl) acrylic acid, α-cyano-β-(3,4-dichlorophenyl) acrylic acid, α-cyano-β-(3,5-dichlorophenyl) acrylic acid, α-cyano-β-(2,3,4-trichlorophenyl) acrylic acid, α-cyano-β-(2,3,5-trichlorophenyl) acrylic acid, α-cyano-β-(2,3,6-trichlorophenyl) acrylic acid, α-cyano-β-(3,4,5-trichlorophenyl) acrylic acid, α-cyano-β-(2,4,6-trichlorophenyl) acrylic acid, α-cyano-β-(2,4,5-trichlorophenyl) acrylic acid, α-cyano-β-(2,3,4,5-tetrachlorophenyl) acryic acid, α-cyano-β-(2,3,5,6-tetrachlorophenyl) acrylic acid, α-cyano-β-(2,3,4,6-tetrachlorophenyl) acrylic acid, and α-cyano-β-pentachlorophenyl acrylic acid.

In general the plant response chemicals of our invention possess the structure

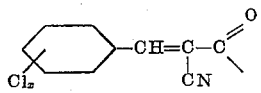

wherein $x$ is in integer from 2 to 5 inclusive.

In addition to the free acids of the above growth regulant compounds we have found that by forming derivatives of the carboxylic group we retain the activity associated with the characteristic structure of the compounds of our invention while often changing secondary properties which for certain applications place the materials in a more practical form for use. However, the grouping portrayed graphically above is the active unit of our materials, and such activity remains on forming carboxylic derivatives thereof. In other words, the organism responds to this grouping. For example by converting the free acid to metallic salts thereof, the solubility of our materials can be changed to permit dilution of our compounds in water or certain other polar solvents. Furthermore, the volatility is thus controlled to make it more suitable for certain applications. However, by such modification the growth response characteristic is not destroyed. For example the alkali metal salts such as those of lithium, sodium and potassium provide derivatives of water solubility; also the salts of the alkaline earth metals, for example magnesium, calcium, strontium and barium can be employed. Likewise for certain applications we prefer the heavy metal salts such as, for example, nickel, chromium, copper, zinc, silver, mercury, moylbdenum, antimony, bismuth, tin, aluminum, manganese, iron and lead salts. While the employment of our growth regulant materials in the form of the metallic salts does not substantially effect their morphological activity, certain embodiments thereof possess important secondary properties, such as for example imparting fungicidal, bacteriostatic, or antiseptic activity along with the growth regulant activity. Further important improvements in ease of formulation and weathering characteristics can be so achieved.

Other salts of our materials can be formed without materially altering the growth regulant properties, such as for example the ammonium salts, hydrazonium salts and other nitrogen-containing salts, such as salts formed with alkyl, aryl and other organo-substituted nitrogen bases. Examples of such nitrogen-containing groups which form salts with our compounds include tripropylammonium, trimethylammonium, phenylammonium, monoethanol-, diethanol- and triethanolammonium salts, triethylammonium, methyldipropylammonium and tribenzylammonium salts. Furthermore, forming ammonium salts with high molecular weight organic radicals such as for example the methyl-ethyl-octadecyl-ammonium group, can provide materials having bacteriostatic effects and important solubility relationships and surface activity. Such modification of the α-cyano-β-polychorophenyl acrylic structure can be employed to impart desirable solubility, weathering, volatility and formulating characteristics as well as for some purposes modify the prevalent properties of the growth response chemical.

In general such ammonium and hydrazonium salts of the α-cyano-β-(polychlorophenyl) acrylates of our invention contain the grouping

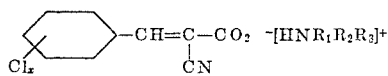

or

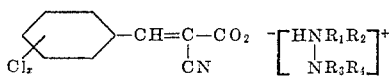

wherein $x$ is an integer from 2 to 5 inclusive, and $R_1$, $R_2$, $R_3$ and $R_4$ include hydrogen, alkyl, cycloalkyl, aralkyl, aryl or combinations thereof as well as substitution products thereof. Thus, such R groups can be hydrogen, methyl, ethyl, propyl, isopropyl, butyl, sec.-butyl, isobutyl, ter.-butyl, the isomeric amyl, hexyl, heptyl, octyl, nonyl, decyl groups, and the like including higher alkyl groups such as stearyl, lauryl, oleyl, octadecyl and the like; cycloalkyl such as cyclobutyl, cyclopentyl, cyclohexyl and the like and substituted cycloalkyl such as methylcyclopentyl, methylcyclohexyl, dimethylcyclohexyl, isopropylcyclohexyl and the like; aralkyl such as benzyl, β-phenethyl, α-phenethyl, α-phenyl-β-chloro-ethyl, ar.-chlorobenzyl, ar.-nitrobenzyl; aryl groups such as phenyl, α-naphthyl, β-naphthyl, p-diphenyl, o-tolyl, m-tolyl, p-tolyl, o-xylyl, 4-ethylphenyl, α-(β-methylnaphthyl), o-chlorophenyl, p-chlorophenyl, 2,4-dichlorophenyl, nitrophenyl, acetophenyl and the like. In general, such groups $R_1$, $R_2$, $R_3$ and $R_4$ can contain negative substituents such as halogen, hydroxyl, hydrocarbonoxy, carbonyl, nitro, nitroso, nitramino, amino, substituted amino, hydroxylamino, sulfhydryl, sulfide, imino and the like groups to further modify the primary growth response characteristics with regard to toxicity, volatility, ease of formulation or produce secondary effects such as penetration and the like.

Further derivatives of our novel growth regulants comprise the thiouronium salts of the α-cyano-β-(polychlorophenyl) acrylic acids.

A similar class of derivatives of our α-cyano-β-polychlorophenyl acrylic growth regulants comprise the organometallic salts. Typical examples of such salt-forming groups which we can incorporate into our growth regulant structure include alkyl-, aryl- and alkylaryl-metallo groups. Generally, such embodiments conform to the structure

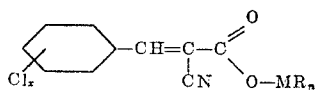

wherein $x$ is an integer from 2 to 5 inclusive, M is any metal which will form organometallic compounds of suitable stability, $n$ is an integer which is one less than the valence of the metal and R is one or more hydrogen, organo, alkyl, cycloalkyl, aryl, aralkyl, alkaryl, alkoxy or aryloxy groups or substituted derivatives thereof and combinations thereof. Typical examples of such metals include mercury, tin, lead, antimony, bismuth, arsenic, germanium, aluminum, boron, gallium, silicon, zinc, tellurium and the like.

Thus, for example methylmercuri, phenylmercuri, ethylmercuri, dibenzyltin, diphenyltin, diethyltin, triethyltin, triphenyltin, diphenylgermanium, dibenzylgermanium, triethylgermanium, dimethylphenylgermanium, ethylthallium, diethylsilicon, dimethylsilicon, diphenylbismuth, ethylcadmium, phenylcadmium, dimethylaminophenylmercuri, ethylmercaptomercuri, tolylmercuri, α-furfurylmercuri, methyltelluri, ethyltelluri, phenyltelluri, trimethyltelluri, dimethylphenyltelluri, dimethylboro, methylphenylboro, dicyclohexylboro, borohydro, boroetherate, dimethyl-p-anisylboro, dimethylarseno, diphenylarseno, methylphenylarseno, dimethylaluminum, diethylaluminum, methylphenylaluminum, ethylzinc, isopropylzinc and methylzinc, α-cyano-β-(polychlorophenyl) acrylates, and the like can be prepared and retain the growth regulant characteristics.

In addition to the sale-like derivatives of our compounds, we can employ them in the form of esters. Among the organic esters which we can employ are the alkyl esters such as for example methyl, ethyl, n-propyl, isopropyl, butyl and isomeric butyl, amyl, hexyl, heptyl, octyl, nonyl, and decyl esters, as well as the higher aliphatic esters such as stearyl, lauryl, and oleyl, esters; cycloalkyl esters such as cyclobutyl, cyclopentyl, cyclohexyl, esters of the polyethers and polyhydric alcohols such as for example esters of pentaerythritol, ethylene glycol, methoxyethanol, ethoxyethanol, butoxyethanol, butoxyethoxypropanol, polyethylene and polypropylene glycols and the various carbitols and Cellosolves, and the like. Likewise aryl esters can be employed and in some instances these are preferred. Examples of such esters include the phenyl, tolyl, xylyl, p-diphenyl, terphenyl, o-diphenyl, α-naphthyl, β-naphthyl esters and the like. We have also found that by substituting other groups or radicals into such organic esters we can achieve important improvements in the applicability of our materials. Thus, in the alkyl and aryl esters the corresponding esters wherein negative groups such as halogen including chlorine, bromine, fluorine and iodine, or various nitrogen-containing radicals such as nitro, nitroso, amine, substituted amino groups, or sulfur-containing radicals such as for example mercaptyl, substituted mercaptyl, sulfide, sulfonic, sulfonyl and sulfonamide radicals and the mixtures thereof are incorporated therein. Thus, we can form the β-chloroethyl, β-bromoethyl, γ-fluoropropyl, 2-hydroxycyclohexyl, β-thiocyanoethyl, β-mercaptoethyl, 4-aminobutyl, diethylaminomethyl, β-dimethylaminoethyl, β-sulfoethyl, and the like, α-cyano-β-(polychlorophenyl) acrylates. Likewise p-tolyl, p-anisyl, 2-nitrophenyl, 2,4-dichlorophenyl, pentachlorophenyl, 2,4,5-trichlorophenyl, p-aminophenyl, o-(N,N-dimethylaminophenyl), α-(4-nitronaphthyl), and the like, α-cyano-β-(polychlorophenyl) acrylates produce novel plant response effects. Similarly typical aralkyl esters provide these effects such as for example α-phenethyl, α-(β-naphthylethyl), benzyl, p-nitrobenzyl, p-chlorobenzyl, 2,4-dichlorobenzyl, 2,4,5-trichlorobenzyl and the like esters of α-cyano-β-(polychlorophenyl) acrylic acid.

Other esters which are effective growth regulants comprise the heterocyclic esters such as the furfuryl, thiophenyl, and quinolyl α-cyano-β-(polychlorophenyl) acrylates.

Other derivatives of the carboxylic function of the growth regulant compositions of our invention include those wherein nitrogen-containing groups replace the hydroxyl of the carboxylic acid. Typical examples of such embodiments of the compounds of our invention include amide and substituted amide groups. Thus, we can provide N-methyl, N-ethyl, N-dimethyl, N-diethyl, N-methylpropyl, N-phenyl, N-p-tolyl, N-xylyl, N-methyl-N-phenyl, N-ethyl-N-phenyl, N-benzyl, N-n-butyl, N-hexyl, N-p-chlorophenyl, N-2,4-dichlorophenyl, N-2,4,5-trichlorophenyl, N-pentachlorophenyl, N-p-diphenyl, N-o-diphenyl, N-o-nitrophenyl, N-p-aminophenyl, N-o-dimethylaminophenyl, N-p-tolylsulfonyl, N-p-dimethylammomethylphenyl, N-p-anisyl, N-α-naphthyl, N-β-naphthyl, N-α-

(2-aminonaphthyl), N-(p-chlorobenzyl), N-(β-phenethyl), N,N-dibenzyl, N-methyl-N-benzyl, N-(β-hydroxyethyl)-N-benzyl, and the like, α-cyano-β-(polychlorophenyl) acrylamides as well as the unsubstituted acrylamides and N-(α-cyano-β-(polychlorophenyl) acrylyl) morpholine and similar heterocyclic amides, as well as N-(α-pyridyl), N-(β-pyridyl), N-(γ-pyridyl), N-(α-thiophenyl), N-(α-quinolyl), N-(β-pyridyl)-N-benzyl and the like α-cyano-β-(polychlorophenyl) acrylamides.

Further, the compounds of our invention comprise the thiol acid derivatives of α-cyano-β-(polychlorophenyl) acrylic acid, such as

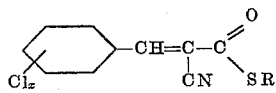

wherein $x$ is an integer from 2 to 5 inclusive and R is hydrogen as in the thiolacids or alkyl, cycloalkyl, aryl, alkylaryl, aralkyl, and the like as in the thiol esters. Thus our compounds comprise α-cyano-β-(polychlorophenyl) thiol acrylic acid as well as, for example, the methyl, ethyl, propyl, isopropyl, butyl, sec.-butyl, isobutyl, ter.-butyl, the isomeric amyl, hexyl, heptyl, octyl, nonyl, decyl, stearyl, lauryl, oleyl, octadecyl, cyclobutyl, cyclopentyl, cyclohexyl, methylcyclopentyl, methylcyclohexyl, dimethylcyclohexyl, isopropylcyclohexyl, benzyl, α-phenethyl, β-phenethyl, phenylchloromethyl, ar.-chlorobenzyl, ar.-nitro-benzene, aryl groups such as phenyl, α-naphthyl, β-naphthyl, p-diphenyl, o-tolyl, m-tolyl, p-tolyl, o-xylyl, 4-ethylphenyl, α-(β-methylnaphthyl), o-chlorophenyl, p-chlorophenyl, 2,4-di-chlorophenyl, nitrophenyl, acetophenyl esters and the like. Furthermore, other thiol acid derivatives of our compounds possess growth response characteristics such as, for example, the metallic, ammonium, hydrazonium, and organometallic salts as above.

Still other derivatives of the α-cyano-β-polychlorophenyl acrylic growth response structure of our invention which have utility in providing morphological responses and are useful as intermediates in further chemical modification include the acid halides, among which the more useful are the chlorides and bromides.

In the following non-limiting, illustrative examples of methods of preparing specific examples of the compounds of our invention and description of certain properties thereof, all parts and percentages are by weight.

EXAMPLE I

*Sodium salt of α-cyano-β-(2,4-dichlorophenyl) acrylic acid.*—In a reactor provided with an agitator and containing 25 parts of water at a temperature of 25° C. was added 55 parts of chloroacetic acid. To the resulting solution was added a premixed solution of 30.7 parts of sodium carbonate in 50 parts of water. This mixture was heated to a temperature of about 35° C. for a period of one-half hour. At the end of this period a solution of 28.5 parts of sodium cyanate in 55 parts of water was added maintaining the temperature at 50° C. This sodium cyanate solution was added in two equal portions, the second portion being added after the heat evolved during the addition of the first portion had dissipated. After the total addition the mixture was cooled to a temperature of about 25° C. and an additional quantity of water was added to provide a mixture comprising a total of 220 parts. The thus resulting solution of sodium cyanoacetate was treated with a solution of 3.85 parts of sodium hydroxide in 220 parts of water after which the mixture was warmed to a temperature of 40° C. and 90 parts of 2,4-dichlorobenzaldehyde was added over a period of 20 minutes. During the addition the agitation provided to the reaction vessel was increased to provide intimate mixing. The mixture was further stirred vigorously for an additional four hours at a temperature of 20° C. The solid product which precipitated during this period was recovered by filtration and washed with 400 parts of benzene in five equal portions. This product, the sodium salt of α-cyano-β-(2,4-dichlorophenyl) acrylic acid, was 127.2 parts corresponding to a yield of 93.5 per cent.

EXAMPLE II

*α-Cyano-β-(2,4-dichlorophenyl) acrylic acid.*—The sodium salt of α-cyano-β-(2,4-dichlorophenyl) acrylic acid prepared as in the foregoing example was dissolved in water and this solution was treated with six normal hydrochloric acid in amount sufficient to acidify the salt. The product which precipitated was recovered by filtration and recrystallized from 50 per cent aqueous ethanol. The resulting white crystals melted at 189 to 191° C. and were found by analysis to contain 29.8 per cent chlorine, corresponding to the formula $C_{10}H_5Cl_2NO_2$ which requires 29.3 per cent chlorine.

The α-cyano-β-polychlorophenyl acrylic growth response agents of our invention can exist in two geometrically isomeric forms in accordance with the following formulas:

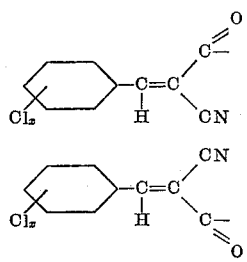

wherein $x$ is an integer from 2 to 5 inclusive. According to the procedure of Example II the stable isomer is formed. This material can be converted to the labile form by suitable methods and such labile isomer can be reconverted to the stable form. To illustrate, a solution of 20 parts of α-cyano-β-(2,4-dichlorophenyl) acrylic acid was dissolved in 1600 parts of hot benzene. One-half of this solution was cooled to a temperature of 25° C. and white crystals of the stable isomer were deposited melting at 193 to 195° C. The second portion of this solution was diluted with an additional 160 parts of benzene and placed in a glass vessel equipped with a reflux condenser protected from atmospheric moisture by means of a calcium chloride drying tube. This vessel was irradiated by a 275 watt G. E. sunlamp for a period of 121 hours. After filtering the hot solution to remove a trace of undissolved solid, the solution was cooled to a temperature of about 25° C. and deposited 5 parts of white crystals. This material had a melting range of 147 to 196° C. When the melting point was determined by heating rapidly to 147° C. a clear melt was formed between 147 and 148° C. When this melt was maintained at a temperature of 150° C. for a period of 5 minutes the melt solidified and upon raising the temperature further remelted at 192 to 195° C., which is the melting point of the stable isomer. The filtrate from which this material had been crystallized upon further evaporation produced an additional quantity of 3 parts of crystalline material which possessed the same melting characteristics as the first crop. By a similar procedure the unstable isomer of other α-cyano-β-polychlorophenyl acrylic acids of our invention and derivatives thereof are produced and reconverted to the stable isomer.

EXAMPLE III

*α-Cyano-β-(3,4-dichlorophenyl) acrylic acid.*—In a process similar to Example I above 51 parts of cyanoacetic acid in 200 parts of water was neutralized with a solution consisting of 32 parts of sodium carbonate in 50 parts of water. To the resulting solution 4 parts of sodium hydroxide dissolved in 250 parts of water was added and the mixture was warmed to a temperature of 40° C. With vigorous agitation 100 parts of molten 3,4-dichlorobenzaldehyde was added over a period of 20 minutes. After stirring for an additional period of two hours, the sodium salt of α-cyano-β-(3,4-dichlorophenyl) acrylic acid which had precipitated was recovered by filtration. This crude salt was washed with 5 portions of benzene each comprising 80 parts and transferred to a vessel provided with an agitator and treated with 600 parts of 10 per cent hydrochloric acid for one hour. The thus liberated acrylic acid was recovered by filtration, washed with 3 portions of 100 parts each of water and dried. The white crystals of α-cyano-β-(3,4-dichlorophenyl) acrylic acid were 125.7 parts corresponding to a yield of 90 per cent. This material had a melting point of 168 to 169° C.

EXAMPLE IV

*α-Cyano-β-(2,4,5-trichlorophenyl) acrylic acid.*—According to the procedure of Example I the sodium salt of α-cyano-β-(2,4,5-trichlorophenyl) acrylic acid was prepared from 10.2 parts of cyanoacetic acid and 21 parts of 2,4,5-trichlorobenzaldehyde. In this process the 2,4,5-trichlorobenzaldehyde was previously dissolved in 250 parts of ethanol. The yield of the sodium salt of α-cyano-β-(2,4,5-trichlorophenyl) acrylic acid was 21 parts corresponding to a yield of 70 per cent. This sodium salt was converted to the free α-cyano-β-(2,4,5-trichlorophenyl) acrylic acid according to the procedure of Example II to provide a light yellow crystalline solid having a melting point of 191 to 193° C.

EXAMPLE V

*α-Cyano-β-(2,3,4,5-tetrachlorophenyl) acrylic acid.*—The sodium salt of α-cyano-β-(2,3,4,5-tetrachlorophenyl) acrylic acid is prepared by treating sodium cyanoacetate with 2,3,4,5-tetrachlorobenzaldehyde according to the procedure of Example I. To recover the free acid the procedure of Example II is employed.

EXAMPLE VI

*Ethyl α-cyano-β-pentachlorophenyl acrylate.*—To a reaction vessel provided with heat transfer means, refluxing means, and a separator for removing water condensed from the reaction mixture was placed 360 parts of pentachlorobenzaldehyde and 163 parts of ethyl cyanoacetate. As a catalyst, 16 parts of piperidine benzoate in 2000 parts of benzene was added. The mixture was heated at the atmospheric reflux temperature for a period of fourteen hours. At the end of this period no further water was recovered from the separator. The benzene was removed by distillation leaving a white solid product of ethyl α-cyano-β-pentachlorophenyl acrylate. This material, 450 parts, corresponded to a yield of 93 per cent. Two crystallizations of this material from ethanol gave white needlelike crystals having a melting point of 158–161° C. This product contained 47.3 per cent chlorine, corresponding to $C_{12}H_6O_2NCl_5$, requiring 47.5 per cent chlorine.

By a series of processes similar to the foregoing other α-cyano-β-polychlorophenyl acrylic acids of our invention are prepared with equally good results. Thus α-cyano-β-(2,3-dichlorophenyl) acrylic acid, α-cyano-β-(3,5-dichlorophenyl) acrylic acid, α-cyano-β-(2,5-dichlorophenyl) acrylic acid, α-cyano-β-(2,6-dichlorophenyl) acrylic acid, α-cyano-β-(2,3,4-trichlorophenyl) acrylic acid, α-cyano-β-(2,3,6-trichlorophenyl) acrylic acid, α-cyano-β-(2,4,6-trichlorophenyl) acrylic acid, α-cyano-β-(2,4,5-trichlorophenyl) acrylic acid, α-cyano-β-(2,3,5,6-tetrachlorophenyl) acrylic acid, α-cyano-β-(2,3,4,6-tetrachlorophenyl) acrylic acid, and α-cyano-β-pentachlorophenyl acrylic acid, are prepared by treating sodium cyanoacetate with 2,3-dichlorobenzaldehyde, 3,5-dichlorobenzaldehyde, 2,5-dichlorobenzaldehyde, 2,6-dichlorobenzaldehyde, 2,3,4-trichlorobenzaldehyde, 2,4,6-trichlorobenzaldehyde, 2,4,5-trichlorobenzaldehyde, 2,3,5,6-tetrachlorobenzaldehyde, 2,3,4,6-tetrachlorobenzaldehyde and pentachlorobenzaldehyde.

EXAMPLE VII

*Diethanolamine salt of α-cyano-β-(2,4-dichlorophenyl) acrylic acid.*—35 parts of α-cyano-β-(2,4-dichlorophenyl) acrylic acid prepared as in Example II was dissolved in 200 parts of absolute ethanol. To this solution at a temperature of about 25° C. was added 15.7 parts of diethanolamine. A white solid precipitated upon addition which was collected by filtration and washed with absolute ethanol. The yield of the white crystals of diethanolamine salt of α-cyano-β-(2,4-dichlorophenyl) acrylic acid was 37.4 parts of 74.5 per cent. This material had a melting point of 131.5 to 132° C.

Similarly the diethanolamine salts of the other α-cyano-β-polychlorophenyl acrylic acids of our invention are prepared in good yield and high purity. For example when α-cyano-β-(3,4-dichlorophenyl) acrylic acid was so treated with diethanolamine a 94 per cent yield of the diethanolamine salt was obtained having a melting point of 137 to 138° C. and containing 20.6 per cent chlorine compared to 20.4 per cent theory.

EXAMPLE VIII

*Triethanolamine salt of α-cyano-β-(2,4-dichlorophenyl) acrylic acid.*—To a solution of 31 parts of α-cyano-β-(2,4-dichlorophenyl) acrylic acid in 160 parts of ethanol at a temperature of 25° C. in a reactor equipped with an agitator was added 19 parts of triethanolamine. The mixture was agitated for a period of one hour until the amine dissolved and was thereupon allowed to stand without agitation for a period of four hours during which period a copious white precipitate formed. This mixture was filtered and the recovered solid was washed with 40 parts of ethanol and 40 parts of ether. From this operation 45.7 parts of white crystals were produced corresponding to a yield of 91 per cent. This material melted with decomposition at a temperature of 98 to 100° C. and contined 18.1 per cent chlorine which is that theoretically required by the formula $C_{16}H_{20}O_5N_2Cl_2$.

EXAMPLE IX

*Phenylmercuric salt of α-cyano-β-(2,4-dichlorophenyl) acrylic acid.*—A mixture of 16.6 parts of the sodium salt of α-cyano-β-(2,4-dichlorophenyl) acrylic acid and 19.7 parts of phenylmercuric chloride was suspended in 500 parts of water and stirred for 40 hours. The product was then collected on a filter, washed with water, and dried. This material did not melt below 280° C. and contined 41.9 per cent mercury and 12.3 per cent chlorine, as compared to the theoretical values of 38.8 per cent mercury and 13.5 per cent chlorine.

We have described the preparation of the α-cyano-β-polychlorophenyl acrylic acids. Furthermore, we have shown illustrative examples of methods of preparing carboxylic derivatives thereof. In general, the manufacture of such derivatives is achieved by methods well known to those skilled in the chemistry of organic carboxylic acids. Other methods than those illustrated will be apparent.

Compounds containing the α-cyano-β-polychlorophenyl acrylic structure possess the remarkable property of plant growth control without visible injury. In some applications in certain varieties of plants this property is evidenced by either a growth inhibition or suppression, or a growth stimulation. Thus when applied to young growing plants, normal growth can be suppressed and proceed at a decreased level of activity. In general, the effects produced by the novel structure of our invention occur through a variety of methods of application. Thus in leafy plants the application can be made directly to the leaf structure, either to the entire leaf structure or to a single leaf. In the latter instance, this clearly demonstrates a translocation of the active ingredient throughout the plant structure. For example, when a single leaf of a tomato plant was treated with a suspension of α-cyano-β-(2,4-dichlorophenyl) acrylic acid at a 1 per cent aqueous concentration, the treated leaf died but no other immediate effects were noted from the balance of the plant. Ten days later, the treated plant was observed to be only one-third the height of a control plant. At the end of a thirty day period the treated plant was only one-half the height of the control plant.

It is frequently noted in treating growing leafy plants with the growth regulants of our invention that apical dominance is decreased, permitting activity of the axillary buds, whereas response to other growth regulants of a suppressive nature is an overall slowdown of growth.

To further illustrate the nature of the growth suppressant effect of the compounds of our invention, a series of test applications was made upon young (5 inch) tomato plants of the Bonny Best variety. In these demonstrations, a suspension of the growth regulant in water containing 0.1 per cent Tween 20 as a wetting agent was sprayed to the extent of 20 milliliters of formulation on five inch plants growing four to a pot. One plant in each pot was carefully protected from the spray and served as a control. Observations were made of both the treated and control plants at periodic intervals as shown in Table I. The data in the table indicate the per cent growth in comparison with the check plants during the indicated intervals. Typical of the normal growth, at the end of 21 days the control plants attained a height of fourteen inches. Although there was no tissue damage in the treated plants and the color was normal the treated plants exhibited formative effects, being unusually bushy with numerous axillary branches. As the observations were continued beyond the indicated period the growth levels of the treated plants began to approach the growth level of the control plants. Upon further observation, the treated plants continued to develop with the formation of buds, flowers and fruits. It is apparent from the data in Table I that the $\alpha$-cyano-$\beta$-polychlorophenyl acrylic structure is responsible for the growth response effect. Thus the free acids, the metal salts, esters, diethanolammonium, triethanolammonium and organo metallic salts, and the like showed growth regulation. It can further be seen that both geometrically isomeric forms (stable and labile) of the $\alpha$-cyano-$\beta$-polychlorophenyl acrylic structures show distinct hormone-like effect upon growing tomato plants. The ethyl ester of $\alpha$-cyano-$\beta$-(2,4-dichlorophenyl) acrylic acid at higher concentrations than shown, for example of the order of 0.05 per cent exhibited herbicidal effects. Other $\alpha$-cyano-$\beta$-(polychlorophenyl) acrylics can be employed at still higher concentrations, and remain growth suppressants, not herbicides.

Other typical $\alpha$ - cyano-$\beta$ - polychlorophenyl acrylic growth regulants exhibiting similar effects on tomato or other growing plants include: sodium $\alpha$-cyano-$\beta$ - (2,6 - dichlorophenyl) acrylate, lithium $\alpha$ - cyano - $\beta$- (2,3,4, - trichlorophenyl) acrylate, barium $\alpha$ - cyano -$\beta$- (2,4,6 - trichlorophenyl) acrylate, ethyl $\alpha$ - cyano - $\beta$- (2,3,5,6 - tetrachlorophenyl) acrylate, $\beta$ - chloroethyl $\alpha$ - cyano - $\beta$ - (2,4, - dichlorophenyl) acrylate, triethyllead $\alpha$-cyano-$\beta$-(2,5-dichlorophenyl) acrylate, dimethylaminophenylmercuri $\alpha$ - cyano - $\beta$ - (2,5 - dichlorophenyl) acrylate, $\alpha$ - furfuryltin $\alpha$ - cyano - $\beta$ - (2,3-dichlorophenyl) acrylate, $\beta$ - dimethylaminoethyl $\alpha$ - cyano-$\beta$-(2,4,5-trichlorophenyl) acrylate, butoxypolyethoxy $\alpha$-cyano-$\beta$-(2,3,5-trichlorophenyl) acrylate, 2,4-dichlorophenyl $\alpha$-cyano-$\beta$-(2,3,6-trichlorophenyl) acrylate, mono- ($\alpha$ - cyano - $\beta$ - (2,4 - dichlorophenyl) acrylate) of ethylene glycol monomethylether, di - ($\alpha$ - cyano - $\beta$- (2,4-dichlorophenyl) acrylate) of ethylene glycol, butoxypropoxypropyl ester of $\alpha$-cyano-$\beta$-(2,4,5-trichlorophenyl) acrylic acid, vinyl $\alpha$ - cyano - $\beta$ - (3,4,5 - trichlorophenyl) acrylate, isoprene $\alpha$ - cyano - $\beta$ - (2,3,4,5 - tetrachlorophenyl) acrylate, butyl $\alpha$-cyano-$\beta$-(2,3,4,6-tetrachlorophenyl) acrylate, copper $\alpha$-cyano-$\beta$-(2,5-dichlorophenyl) acrylate, tetramethylhydrazonium $\alpha$-cyano-$\beta$-3,5 - dichlorophenyl acrylate, $\beta$ - thiocyanoethyl $\alpha$ - cyano-$\beta$ - (2,4 - dichlorophenyl) acrylate, N - methyl $\alpha$ - cyano-$\beta$-(2,4,5-trichlorophenyl) acrylamide, N-($\beta$-hydroxyethyl)-N-benzyl $\alpha$ - cyano - $\beta$ - (2,4 - dichlorophenyl) acrylamide, N - (2,4,5 - trichlorophenyl) $\alpha$ - cyano - $\beta$ - (3,4-dichlorophenyl) acrylamide, N - ($\alpha$ - naphthyl) $\alpha$ - cyano-$\beta$ - (pentachlorophenyl) acrylamide, $\alpha$ - cyano - $\beta$ - (2,4-dichlorophenyl)thioacrylic acid, ar. - chlorobenzyl $\alpha$-cyano - $\beta$ - (pentachlorophenyl)thioacrylate, trichloromethyl $\alpha$ - cyano - $\beta$ - (pentachlorophenyl) thioacrylate, and the like.

To indicate the lack of injury to the growing plants after treatment with the growth regulants of our invention, further data are presented in Table II to illustrate the effect on treated plants of typical members of the growth regulants of our invention at 34 days. Thus, it can be seen on a quantitative basis that while at the end of a four day period approximately fifty per cent suppression of growth had occurred, by the end of 34 days the growth of the treated plants was within 80 per cent of the untreated control plants.

TABLE I

*Increase in height of tomato plants, per cent of control, after treatment with growth regulant*

| Compound | Concentration, percent | Days After Treatment | | | | | | |
|---|---|---|---|---|---|---|---|---|
| | | 4 | 8 | 11 | 14 | 20 | 26 | 30 | 34 |
| $\alpha$-Cyano-$\beta$-(2,4-dichlorophenyl) acrylic acid | 0.1 | 40 | 15 | 19 | 20 | 13 | 19 | ---- | 28 |
| Diethanolammonium $\alpha$-cyano-$\beta$-(2,4-dichlorophenyl) acrylate | .4 | ---- | ---- | ---- | ---- | ---- | ---- | 12 | ---- |
| Triethanolammonium $\alpha$-cyano-$\beta$-(2,4-dichlorophenyl) acrylate | .1 | 31 | 16 | 33 | 30 | 34 | 47 | 42 | 46 |
| Phenylmercuric $\alpha$-cyano-$\beta$-(2,4-dichlorophenyl) acrylate | .025 | ---- | 38 | 26 | 32 | 36 | 29 | ---- | 50 |
| $\alpha$-Cyano-$\beta$-(2,4-dichlorophenyl) acrylic acid, labile isomer | .05 | 9 | 26 | 24 | 26 | 36 | 45 | 57 | 47 |
| Ethyl $\alpha$-cyano-$\beta$-(2,4-dichlorophenyl) acrylate | .0125 | 13 | 9 | 16 | 22 | 30 | 44 | ---- | 56 |
| Sodium $\alpha$-cyano-$\beta$-(2,4-dichlorophenyl) acrylate | .05 | 53 | 42 | 42 | 42 | 50 | 51 | ---- | 53 |
| Diethanolammonium $\alpha$-cyano-$\beta$-(3,4-dichlorophenyl) acrylate | .1 | ---- | ---- | ---- | ---- | ---- | ---- | 64 | ---- |
| $\alpha$-cyano-$\beta$-(3,4-dichlorophenyl) acrylic acid | .4 | ---- | 58 | ---- | ---- | ---- | ---- | ---- | ---- |
| Ethyl $\alpha$-cyano-$\beta$-pentachlorophenyl acrylate | .2 | ---- | ---- | ---- | ---- | ---- | ---- | 62 | ---- |

TABLE II

*Recovery of tomato plants after treatment, per cent of control*

| Compound | Concentration, Percent | Days after Treatment | |
|---|---|---|---|
| | | 4 | 34 |
| Triethanolammonium $\alpha$-cyano-$\beta$-(2,4-dichlorophenyl) acrylate | 0.0125 | 53 | 80 |
| $\alpha$-Cyano-$\beta$-(2,4-dichlorophenyl) acrylic acid, labile isomer | .025 | 49 | 78 |
| Phenylmercuric $\alpha$-cyano-$\beta$-(2,4-dichlorophenyl) acrylate | .0063 | 44 | 80 |

To illustrate the ability to control the extent of growth suppression by materials of our invention, typical data are presented in Table III to indicate the dependence of the extent of the effect upon the concentration in which the material is supplied to the growing plant. In each of the following tests the entire plant was sprayed with the formulation of the growth regulant as described above at a total dosage of 20 millimeters per plant. The only variation was in concentration, as indicated, of the active ingredient. Considering the data presented for $\alpha$-cyano-$\beta$-(2,4-dichlorophenyl) acrylic acid, it is evident that at concentrations of the order of 0.05 to 0.1 per cent growth of the young plants was essentially stopped during the first eight days. Furthermore, at the end of more than a month after treatment, growth was progressing at a very low level. However, when only a moderate suppression of growth is desired, it is apparent that this can be achieved by employing still smaller concentrations, of the order of 0.01 per cent. Likewise by employing triethanol-ammonium α-cyano-β-(2,4-dichlorophenyl) acrylate in a low order of concentration, of the magnitude of 0.01 per cent, a moderate suppression of growth can be achieved during the first eight days after treatment, while after one month growth is approaching that of the controls. Similar results are obtained by employing the other α-cyano-β-polychlorophenyl acrylic compounds of our invention. By selection of a particular carboxylic derivative and a method and time of application, as well as concentration, control of growth effects can be achieved which are important in determining the ripening time or maturity of a fruit or other yield crop upon which the material is applied. This ability to control the rate of growth and the time of maturity is of extreme importance to the agricultural industry, both to determine in advance the period in which the harvest can be made, and also to overcome dependence upon climatic and other factors normally beyond the control of the grower. Thus if a young crop is planted and adverse growing conditions are encountered, it is possible by employing the compounds of our invention to delay, for example, the setting of fruit until climatic conditions are more favorable for the maturing and ripening of such fruit. Stil other methods of employing the novel growth suppression effects of our compounds will be apparent.

TABLE III

*Effect of concentration on extent of growth suppression, per cent of control*

| Compound | Concentration, Percent | Days after Treatment | |
|---|---|---|---|
| | | 8 | 34 |
| α-Cyano-β-(2,4-dichlorophenyl) acrylic acid | 0.0125 | 80 | 75 |
| | .025 | 45 | 62 |
| | .05 | 17 | 37 |
| | .1 | 15 | 28 |
| Triethanolammonium α-cyano-β-(2,4-dichlorophenyl) acrylate. | 0.0125 | 53 | 80 |
| | .025 | 53 | 73 |
| | .05 | 62 | 61 |
| | .1 | 31 | 46 |

To illustrate that the compounds of our invention not only suppress the linear growth of plants but also suppress the rate of maturing, Table IV is presented wherein typical α-cyano-β-polychlorophenyl acrylates were applied to young tomato plants and observations were made over a period of 34 days. In the table a list of the concentrations in which complete suppression of blossoming, and in most instances of the formation of buds, was achieved

TABLE IV

*Effect on budding*

| Compound | Concentration, percent, at which no bud or blossom appeared 34 days after treatment [1] |
|---|---|
| α-Cyano-β-(2,4-dichlorophenyl) acrylic acid | 0.05 |
| Sodium α-cyano-β-(2,4-dichlorophenyl) acrylate | .025 |
| Triethanolammonium α-cyano-β-(2,4-dichlorophenyl) acrylate | .1 |
| α-Cyano-β-(2,4-dichlorophenyl) acrylic acid, labile isomer | .05 |
| Ethyl α-cyano-β-(2,4-dichlorophenyl) acrylate | .0125 |
| Phenylmercuric α-cyano-β-(2,4-dichlorophenyl) acrylate | .0125 |
| Diethanolammonium α-cyano-β-(2,4-dichlorophenyl) acrylate | .4 |
| Diethanolammonium α-cyano-β-(3,4-dichlorophenyl) acrylate | .2 |
| Ethyl α-cyano-β-pentachlorophenyl acrylate | .2 |

[1] Control plants had flower or small fruit at 34 day period.

for 34 days, during which period the control plants all contained blossoms or small fruits. At the concentrations listed in the table, none of the treated plants had any evidence of fruit formation, although upon further growth, the plants developed normally in all respects and produced a harvest of fruit.

The ability to suppress the growth of plant species is not limited to any one class of plants or plant species. Thus, for example, a great variety of important agricultural plant types can be treated with the compounds of our invention and achieve important growth regulation effects. Among the many varieties of plants which have been so treated successfully by the compounds of our invention are included those primarily grown for their flowers, those primarily grown as fruit crops, those primarily grown for the seed yield such as the legumes, corn and grasses, as well as a great variety of woody, herbacious and ornamental plant species. Illustrative of the wide variety of plant species responding to the growth regulation characteristics of the α-cyano-β-polychlorophenyl acrylic structure, the following Table V is presented. Three weeks after treatment the plants were dessicated and the per cent dry weight of the plants was compared to that of control plants.

TABLE V

*Effect of α-cyano-β-(2,4-dichlorophenyl) acrylic acid on dry weight three weeks after application as total spray, percent of control*

| Concentration, Percent | Sunflower | Radish | Soybean |
|---|---|---|---|
| 0.4 | 67 | 14 | 66 |
| .2 | 71 | 41 | 73 |
| .1 | 89 | 57 | 81 |
| .05 | 95 | 79 | 94 |

To illustrate the effect of growth stimulation by our growth response agents, α-cyano-β-(3,4-dichlorophenyl) acrylic acid was applied to young tomato plants at 0.2 per cent concentration. At the end of 21 days after treatment the plants were harvested and the dry weight was determined and compared with untreated control plants. The treated plants, which were 13 per cent taller than the controls at harvest time had a dry-weight 22 per cent in excess of the controls. In a similar demonstration α-cyano-β-(2,4-dichlorophenyl) acrylic amide produced a suppressant effect of 23 per cent in height, and 22 per cent in dry weight over the controls.

It has long been considered desirable to provide a class of agents capable of preventing the flowering of buds on growing or cut plants. In handling ornamental flowers great losses are incurred by the premature opening of the blossoms and subsequent withering of the plants before the blossoms can be disposed of. The ability to control the opening of the flower bud to produce a blossom is likewise important among commercial agricultural crops. Heretofore, the materials proposed for this application, while successful to a limited degree in preventing the formation of the flower, have caused more or less deep seated alterations in the color, form or scent of the flower, or have interfered with ability of the flower to produce viable seed. Furthermore, such treatments frequently cause mutations to occur in the seed. We have discovered that when applied to the buds of a great variety of plants, the compounds of our invention are capable of retarding the blossoming period for important lengths of time. Upon eventual opening of a flower bud we have found that the blossom produced is in every way the equivalent of the blossom produced upon the untreated plant. The only apparent change in the growth habit of the plant is in the delayed opening of the blossom and no apparent change or damage to the blossom can be seen. To illustrate this properly, plants of the budding dwarf French marigolds were treated with a total aqueous application of typical compounds of our invention. Depending upon the concentration applied the blossoming period was delayed for periods of four to twelve days. The flowers produced by the treated plants were normal in color and appearance. The results of this treatment are tabulated in Table VI.

TABLE 6

*Blossoming inhibition of marigold by α-cyano-β-(2,4-dichlorophenyl) acrylic acid, means of flowering dates*

| Concentration, per cent: | Flowering dates |
|---|---|
| 0.0 | 15 |
| .05 | 19 |
| .1 | 19 |
| .2 | 21 |
| .4 | 27 |

The universal character of the growth suppressant effect of the compounds of our invention is ably illustrated by a demonstration wherein the growth regulation was achieved by soil treatment of a plant. A plot of tomtato plants was divided into three sections. The first section was treated with a one per cent aqueous spray of diethanolammonium α-cyano-β-(2,4-dichlorophenyl) acrylate. The soil was protected so that the solution was applied to the foliage only. In the second plot, an equal amount of solution of equal concentration was poured into the soil in the root area of the plants. The third group of plants in this plot was left untreated as a control. At the end of a 21 day growth period following treatment both the soil and foliage treated plants were equally suppressed in growth compared to the controls. Both treated plots showed the characteristic axillary branching which this particular material initiates. However, the leaf margins of the foliage treated plants were observed to exhibit a slight burning effect while the soil treated plants were uninjured and showed no visible signs of damage or effect other than the reduced linear growth and increased axillary branching. The color of the treated plants was equivalent to that of the untreated plants and on further observation were observed to resume normal growth.

Another important effect exhibited by the growth regulant compositions of our invention is the ability to prevent the sprouting of a great variety of tuberous materials. This ability is particularly important in the commercial culture of plants which are tuberous propagated, such as for example, the potato and the turnip. To demonstrate, the ability of the compounds of our invention to prevent sprouting under conditions when such would occur to a disastrous extent, the following demonstration was made. Irish-Cobbler potatoes were treated with an acetone solution of the growth regulant chemical. This sample was adjusted so that fourteen tubers weighed 1.0 kilogram, and when dipped into the acetone solution, fourteen milliliters of formulation was required to cover the surface of each tuber in the lot. After treatment each sample was placed in a one gallon earthenware crock. Paper was used to fill the crocks and a cover of heavy wrapping paper was tied over the top. The covered crocks were then placed in a chamber with continuous air circulation and permitted to stay in such storage for a period of four months. Thus, when a saturated solution of phenylmercuric α-cyano-β-(2,4-dichlorophenyl) acrylate in acetone was employed, it was observed that by dilution with acetone to the one-quarter saturated level, complete inhibition of sprouting was obtained. Likewise, the same effect was produced by other α-cyano-β-polychlorophenyl acrylic materials at comparable concentration. When other materials of our invention are so employed in preventing sprouting of other tuberous crops equally effective results are obtained at concentrations of the same order of magnitude.

To demonstrate the effectiveness of the growth regulants of our invention in preventing the sprouting of leaves and buds of woody plants, nine inch dormant cuttings of *Hibiscus syriacus* (Rose of Sharon) were swabbed with an acetone solution of typical examples of the growth regulants of our invention. Both the treated and untreated cuttings were placed in water for a period of 45 days after which observations were made. All of the check plants were found to have well developed leaves and root systems. Cuttings treated, for example, with ethyl α-cyano-β-(2,4-dichlorophenyl) acrylate at a concentration of one weight per cent showed complete inhibition of both sprouting and cutting. Sodium α-cyano-β-(2,4-dichlorophenyl) acrylate showed complete inhibition of both sprouting and root formation at a concentration of 0.5 weight per cent while phenylmercuric α-cyano-β-(2,4 dichlorophenyl) acrylate was effective in 1.0 weight per cent. Such results are typical of those obtained with our materials in a wide range of formulations and on a wide variety of woody plants.

Retardation of the growth of woody plants, shrubs or trees is an effect which has important implications in many fields of agriculture. For example, by delaying the budding or blossoming of citrus trees during a period when frost conditions threaten or, in northern climates, to retard the spring budding of fruit trees such as the apple, cherry, pear, peach and the like would in many instances determine the difference between a crop of fruit and a complete loss. Similarly in the treatment of ornamental shrubs and trees, the ability to delay spring blossoming has great utility.

The surprising effectiveness of the α-cyano-β-polychlorophenyl acrylic growth regulants is evidenced in a variety of formulations and in a great variety of concentrations. For example, growth response is achieved by employing our materials in aqueous solution or in aqueous suspension. In the latter instance it is frequently desirable to employ along with the aqueous suspension a dispersing agent. Examples of such surface-active agents which can be employed in forming dispersions include salts of the alkyl and alkylaryl sulfonates, such as duPont MP-189 and Nacconol-NR, alkyl sulfates, such as Dreft, alkylamide sulfonates, such as Igepon-T, the alkylaryl polyether alcohols, such as Triton X-100, the fatty acid esters of polyhydric alcohols, such as Span, the ethylene oxide addition products of such esters, as for example Tween, and the addition products of long-chain mercaptans and ethylene oxide, such as Sharples Non-Ionic-218. Still other surface-active agents can be employed, the above merely showing a representative list of the more common materials.

Likewise, it is possible to achieve the growth regulation characteristic of the α-cyano-β-polychlorophenyl acrylic structure in dry formulations. In such formulations the active ingredient is extended in a solid inert carrier. Typical of such carriers are talc, clay, cellulosic powders or other solid diluents. Such formulations have particular utility in the treatment of seeds, wherein an aqueous application may promote premature germination, or where a solvent application may damage the seed. For certain field crop applications we also prefer a dust formulation wherein a wet application might introduce a certain secondary effect which is undesirable. Further specific examples of such typical inert solid carriers which can be employed as diluents in our dust formulations include fuller's earth, pyrophillite, bentonite, montmorillonite, attaclay, the Filtrols, celite and the like.

The α-cyano-β-polychlorophenyl acrylic growth regulants of our invention are in many instances soluble in a great variety of solvents. Among the organic solvents which can be employed as the carrier for our active agents we use hydrocarbons, such as benzene, xylene or toluene; ketones, such as acetone, methylethyl ketone and cyclohexanone; chlorinated solvents, such as carbon tetrachloride, trichloro- and perchloroethylene; esters, such as ethyl, butyl, and amyl acetates; and alcohols, such as ethanol, isopropanol, and amyl alcohols. Other solvents which we employ are the carbitols and cellosolves, the former comprising in general the monoalkyl ethers of diethylene glycol and the latter the monoalkyl ethers of ethylene glycol. In addition, combinations of these various typical solvents can be employed whereby special volatility and viscosity characteristics can be imparted to our formulations.

Furthermore a combination of such methods of application can be employed in order to achieve desirable spreading or wetting characteristics. Typical of such formulations include wettable powders wherein the active ingredient is first admixed with a solid carrier as described above in combination with a small amount of dispersing or surface-active agent. The resultant dry formulation can then be added to water for further dilution prior to application and provide a dispersion of the active ingredient and the solid carrier in water. Likewise oil-in-water emulsions can be employed and are sometimes preferred. Typical of such formulations are compositions wherein the active ingredient is first dissolved in an organic solvent either soluble or insoluble in water and this concentrated solution is then added to water with or without a surface active agent to form emulsions suitable for application.

In addition we have found that we can incorporate an inherent or sticking agent such as vegetable oils, naturally occurring gums and other adhesives in our α-cyano-β-polychlorophenyl acrylic growth regulants. Furthermore we can employ humectants in our formulations. In addition such formulations can be employed in admixture with fungicidal materials, other biocides such as insecticides, larvicides, bactericides, herbicides, growth suppressants, vermicides, miticides or with other materials which are desired to apply along with our growth regulants including such diverse materials as fertilizers.

Having thus described typical α-cyano-β-polychlorophenyl acrylic growth regulants, methods for their preparation, formulation and application, and having described typical results obtained on living plants by so applying, we do not intend that our invention be limited except by the appended claims.

We claim:

1. A new composition of matter selected from the group consisting of α-cyano-β-(polychlorophenyl) acrylic acid and carboxylic derivatives thereof.

2. α-Cyano-β-(2,4-dichlorophenyl) acrylic acid.

3. As new compositions of matter, salts of monomeric α-cyano-β-polychlorophenyl acrylic acid.

4. Metal salts of monomeric α-cyano-β-polychlorophenyl acrylic acid.

5. Sodium α-cyano-β-2,4-dichlorophenyl acrylate.

6. As new compositions of matter, ammonium salts of monomeric α-cyano-β-polychlorophenyl acrylic acid.

7. The triethanolamine salt of α-cyano-β-2,4-dichlorophenyl acrylic acid.

8. As new compositions of matter, esters of monomeric α-cyano-β-polychlorophenyl acrylic acid.

9. Ethyl-α-cyano-β-2,4-dichlorophenyl acrylate.

10. As new compositions of matter, amides of monomeric α-cyano-β-polychlorophenyl acrylic acid.

11. A plant response composition consisting essentially of an aqueous dispersion of a monomeric α-cyano-β-polychlorophenyl acrylic growth regulant in amount sufficient to provide a positive plant response and a surface active agent.

12. A plant response composition consisting essentially of a monomeric-α-cyano-β-polychlorophenyl acrylic growth regulant in amount sufficient to provide a positive plant response and a solid inert carrier.

13. A plant response composition consisting essentially of a monomeric-α-cyano-β-polychlorophenyl acrylic growth regulant in amount sufficient to provide a positive plant response, a solid inert carrier and a surface active agent.

14. An aqueous oil emulsion plant response composition containing as a principal active ingredient a monomeric α-cyano-β-polychloro acrylic growth regulant in amount sufficient to provide a positive plant response.

15. A new composition of matter selected from the group consisting of monomeric α-cyano-β-(polychlorophenyl) acrylic acid and monomeric α-cyano-β-(polychlorophenyl) thiol acrylic acid.

16. A new composition of matter selected from the group consisting of alkyl esters of monomeric α-cyano-β-(polychlorophenyl) acrylic acid, polyether esters of α-cyano-β-(polychlorophenyl) acrylic acid and polyhydric alcohol esters of α-cyano-β-(polychlorophenyl) acrylic acid.

17. A plant response composition containing as a principal active ingredient in amount sufficient to provide a positive plant response a material selected from the group consisting of a monomeric α-cyano-β-(polychlorophenyl) acrylic acid and carboxylic derivatives thereof and a substantially inert carrier as an adjuvant therefor.

18. A method for regulating the growth processes of plants which comprise applying thereto in amount sufficient to provide a positive plant response a material selected from the group consisting of a monomeric α-cyano-β-(polychlorophenyl) acrylic acid and carboxylic derivatives thereof.

19. A new composition of matter selected from the group consisting of the diethanolamine salt of monomeric α-cyano-β-polychlorophenyl acrylic acid and the triethanolamine salt of monomeric α-cyano-β-polychlorophenyl acrylic acid.

References Cited in the file of this patent

UNITED STATES PATENTS

| | | |
|---|---|---|
| 2,326,471 | Lontz | Aug. 10, 1943 |
| 2,394,916 | Jones | Feb. 12, 1946 |
| 2,446,836 | King | Aug. 10, 1948 |
| 2,655,446 | Todd | Oct. 13, 1953 |

OTHER REFERENCES

Walther et al. in "Beilstein's Handbuch der Organischen Chemie," 4th Edition (1926), vol. 9, page 895.